United States Patent
Houghton

(10) Patent No.: US 9,772,210 B1
(45) Date of Patent: Sep. 26, 2017

(54) STORAGE TANK LEVEL DETECTION METHOD AND SYSTEM

(75) Inventor: Brian L. Houghton, Littleton, CO (US)

(73) Assignee: Brian L. Houghton, Littleton, CO (US)

( * ) Notice: Subject to any disclaimer, the term of this patent is extended or adjusted under 35 U.S.C. 154(b) by 403 days.

(21) Appl. No.: 13/493,712

(22) Filed: Jun. 11, 2012

(51) Int. Cl.
*G01F 23/22* (2006.01)
*G01F 23/24* (2006.01)

(52) U.S. Cl.
CPC ........... *G01F 23/22* (2013.01); *G01F 23/246* (2013.01); *G01F 23/247* (2013.01)

(58) Field of Classification Search
CPC ...... G01F 23/22; G01F 23/246; G01F 23/247; G01F 23/0061; G01F 23/00; G01F 1/68; G01F 22/00
USPC ..... 73/295, 290 R, 292, 61.76; 702/55, 130; 374/45, E13.001, 102, 137
See application file for complete search history.

(56) References Cited

U.S. PATENT DOCUMENTS

| | | |
|---|---|---|
| 1,778,508 A | 10/1930 | Peoples |
| 2,145,966 A | 2/1939 | Bedell |
| 2,468,676 A | 4/1949 | Liben |
| 2,927,301 A | 3/1960 | Booth et al. |
| 3,965,983 A | 6/1976 | Watson |
| 4,122,718 A | 10/1978 | Gustafson |
| 4,318,298 A | 3/1982 | Godbey et al. |
| 4,354,180 A | 10/1982 | Harding |
| 4,408,676 A | 10/1983 | McCoy |
| 4,449,384 A | 5/1984 | Jones |
| 4,459,584 A | 7/1984 | Clarkson |
| 4,509,552 A | 4/1985 | Eicher et al. |
| 4,637,463 A | 1/1987 | McCoy |
| 4,814,752 A | 3/1989 | Lehman |
| 4,934,186 A | 6/1990 | McCoy |
| 4,949,069 A | 8/1990 | Wilson |
| 4,982,606 A | 1/1991 | Adamski et al. |
| 5,026,954 A | 6/1991 | Cebulski |
| 5,028,910 A | 7/1991 | Meacham et al. |
| 5,210,769 A | 5/1993 | Seidel et al. |
| 5,347,864 A | 9/1994 | Senghaas et al. |
| 5,471,872 A | 12/1995 | Cummings |
| 5,493,877 A | 2/1996 | Wickremasinghe |
| 5,565,687 A | 10/1996 | Berrill |

(Continued)

OTHER PUBLICATIONS

Response in CA Pat. App. No. 2783779 filed Jul. 25, 2012 filed by applicant Sep. 11, 2014.

(Continued)

*Primary Examiner* — Hezron E Williams
*Assistant Examiner* — Marrit Eyassu

(57) ABSTRACT

A fluid (oil) storage tank is often in a remote place. A temperature sensor strip is affixed vertically down the outside of the tank. Each sensor sends its electronic signature and temperature to a local microprocessor. Various types of computations yield an accurate level indication on a local display, all powered by a car battery, solar panel or power supply. Data can be sent remotely as well. For explosive environments only a small processor is powered adjacent the tank. Then a second processor has the power to compute and analyze the raw temperature data and display it at a safe distance from the tank with only a twisted pair of low volt wires reaching the tank. Other non-explosive tanks such as a water tank can use a signal processor adjacent the strip for all data collection, computing and display functions.

12 Claims, 15 Drawing Sheets

(56) References Cited

U.S. PATENT DOCUMENTS

| | | | |
|---|---|---|---|
| 5,602,540 A | 2/1997 | Spillman, Jr. | |
| 5,613,399 A | 3/1997 | Hannan et al. | |
| 5,743,135 A | 4/1998 | Sayka et al. | |
| 5,773,913 A | 6/1998 | Casselden | |
| 5,834,710 A | 11/1998 | Finnestad | |
| 6,028,521 A | 2/2000 | Issachar | |
| 6,085,836 A | 7/2000 | Burris et al. | |
| 6,218,949 B1 | 4/2001 | Issachar | |
| 6,388,577 B1 | 5/2002 | Carstensen | |
| 6,434,495 B1 | 8/2002 | Kitamura et al. | |
| 6,450,258 B2 | 9/2002 | Green et al. | |
| 6,615,658 B2 * | 9/2003 | Snelling | 73/295 |
| 6,624,755 B1 | 9/2003 | Chamberlin | |
| 6,634,426 B2 | 10/2003 | McCoy et al. | |
| 6,710,720 B2 | 3/2004 | Cartensen et al. | |
| 6,758,277 B2 | 7/2004 | Vinegar et al. | |
| 6,862,932 B2 | 3/2005 | Zimmermann et al. | |
| 6,959,599 B2 | 11/2005 | Feldstein et al. | |
| 6,972,685 B2 | 12/2005 | Sato et al. | |
| 6,990,861 B2 | 1/2006 | Ham | |
| 7,004,625 B2 * | 2/2006 | Egidio | G01K 1/026 374/112 |
| 7,360,417 B2 | 4/2008 | Dockendorff et al. | |
| 7,373,976 B2 | 5/2008 | Casey | |
| 7,445,934 B2 | 11/2008 | DiFoggio et al. | |
| 7,519,005 B2 | 4/2009 | Hejdeman | |
| 7,571,646 B1 | 8/2009 | Houghton | |
| 7,720,618 B2 | 5/2010 | Zarowny et al. | |
| 8,109,670 B2 * | 2/2012 | Al-Misfer | G01F 23/22 136/200 |
| 2002/0096323 A1 | 7/2002 | Burris et al. | |
| 2004/0065148 A1 * | 4/2004 | Ham | 73/295 |
| 2004/0163806 A1 | 8/2004 | Hadley | |
| 2005/0081623 A1 * | 4/2005 | Frank | 73/295 |
| 2005/0126282 A1 * | 6/2005 | Maatuk | 73/295 |
| 2006/0191323 A1 * | 8/2006 | Garabedian et al. | 73/40 |
| 2007/0251960 A1 * | 11/2007 | Al-Misfer | G01F 23/22 222/590 |
| 2008/0223452 A1 * | 9/2008 | Lin | 137/386 |
| 2012/0330570 A1 * | 12/2012 | Hedl et al. | 702/39 |

OTHER PUBLICATIONS

Notice of Allowance in CA Pat App. No. 2783779.
Electrolab Model 22100 DLS Digital Level Sensor product information from website www.electrolabcontrols.com on Jun. 26, 2015.

* cited by examiner

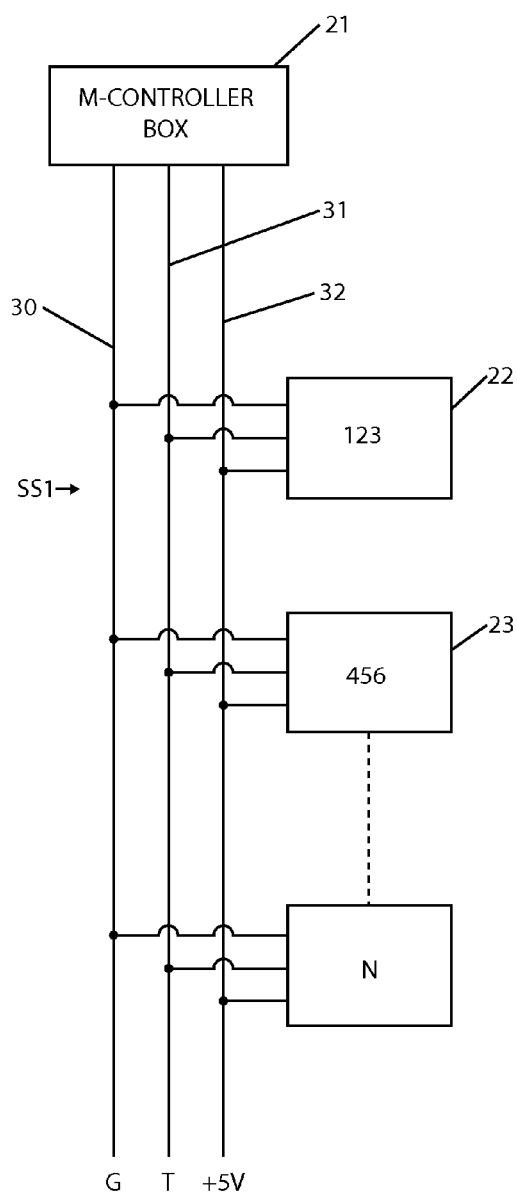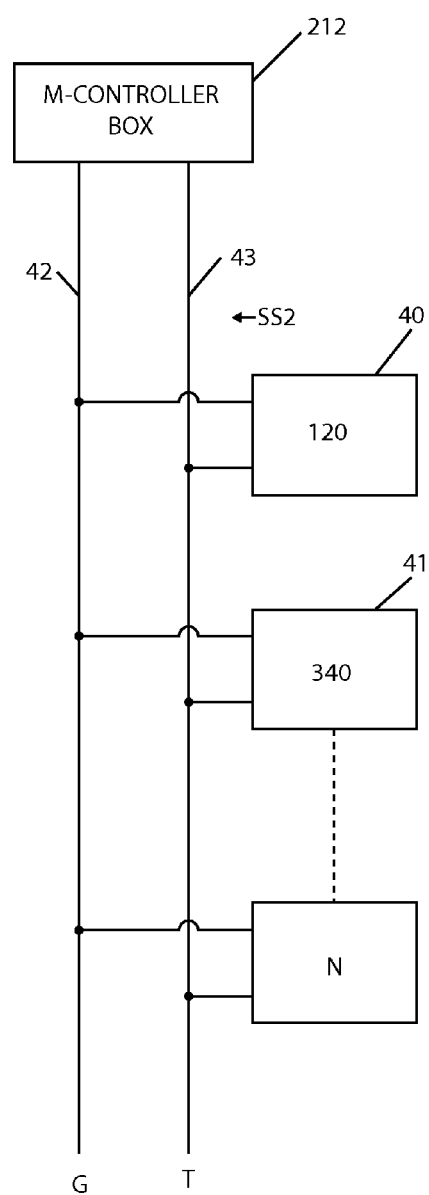

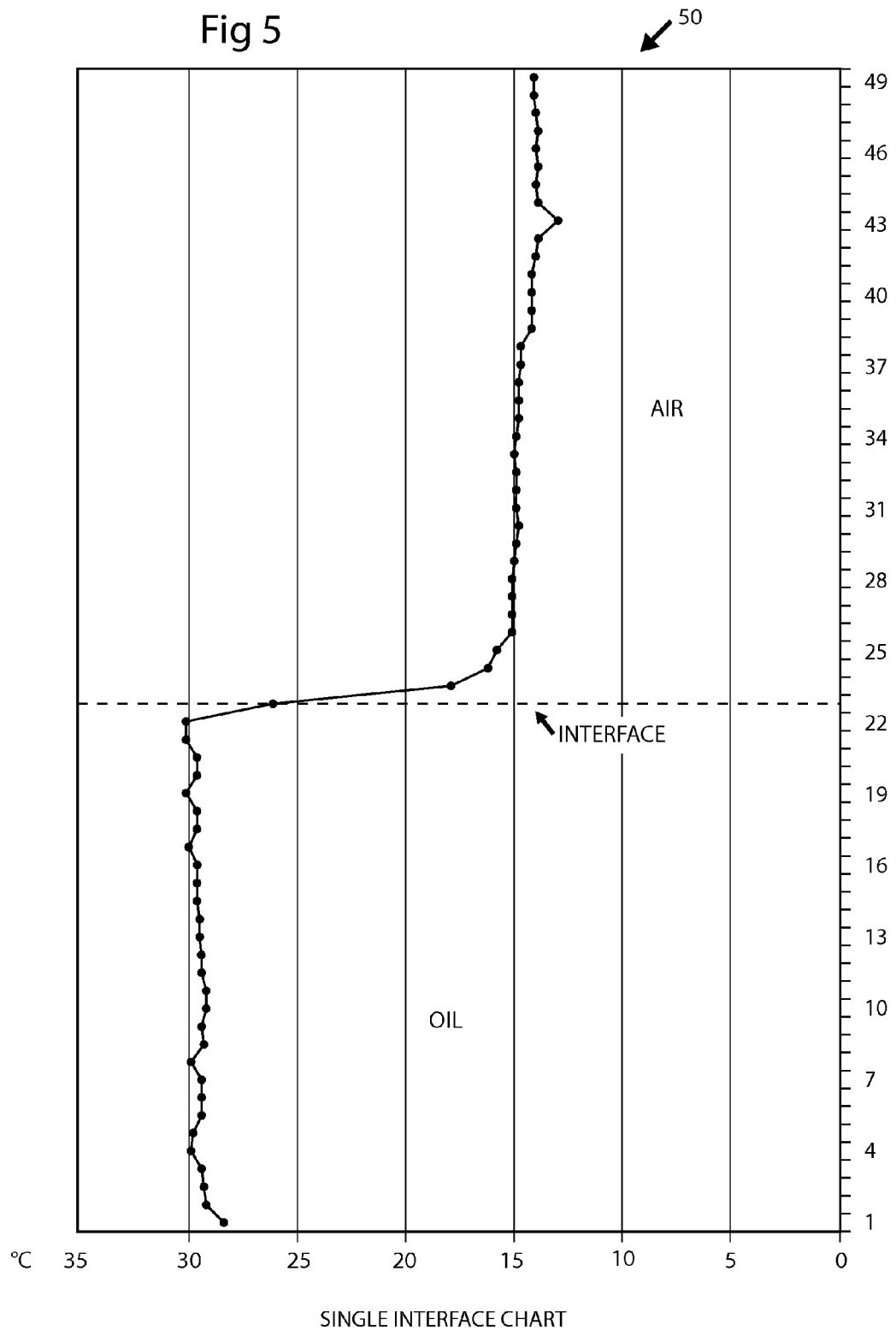

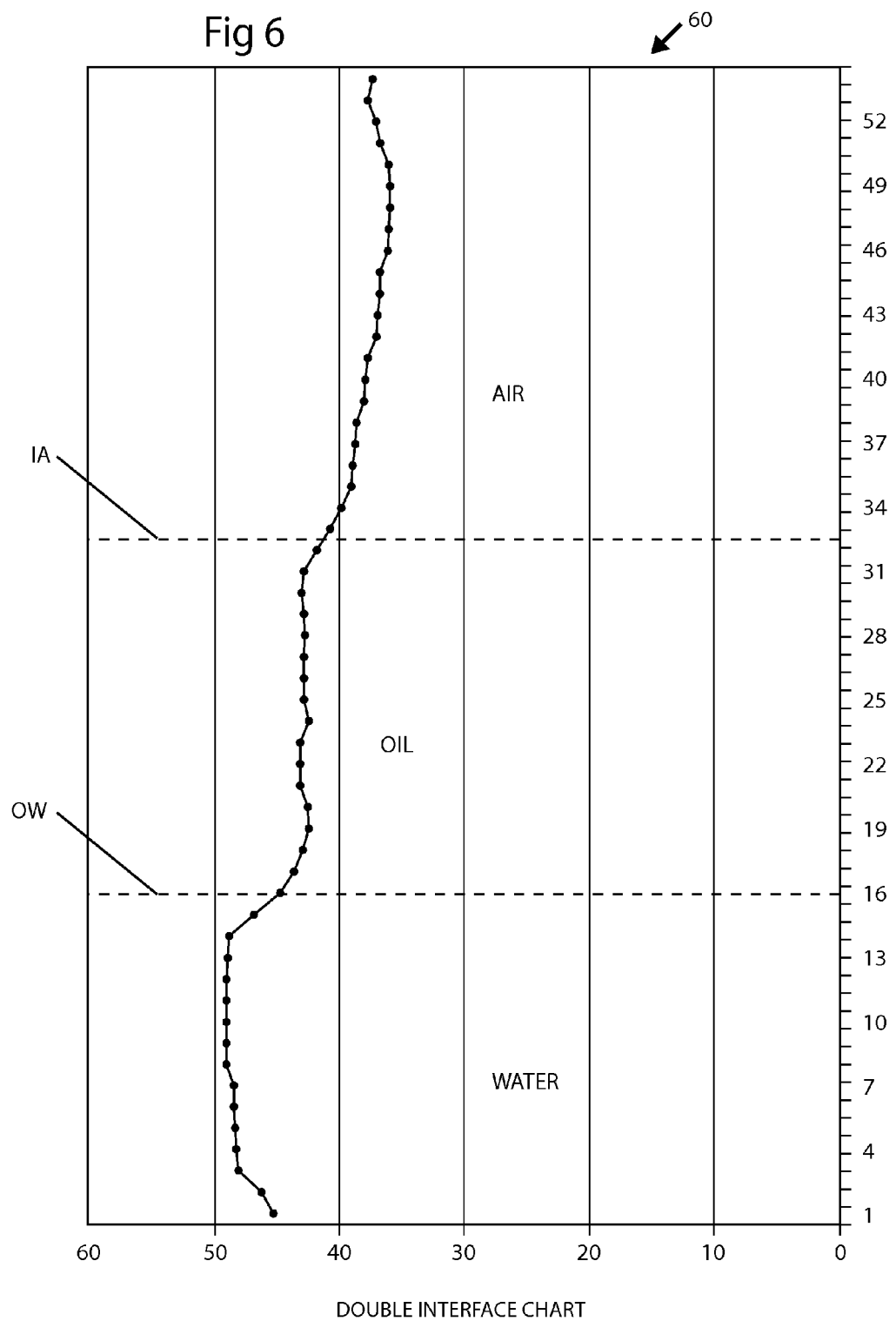

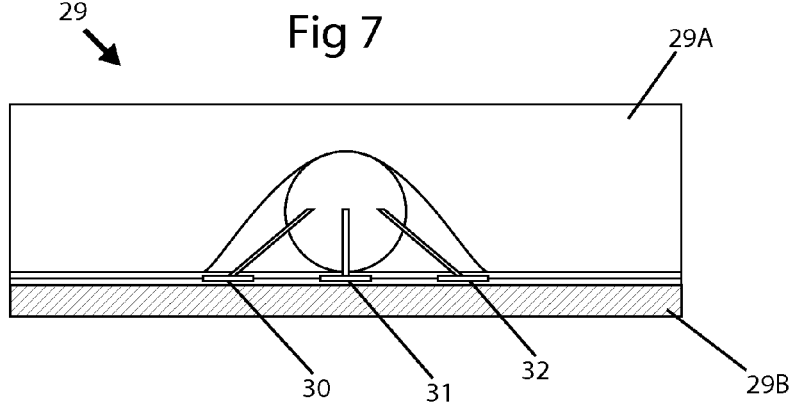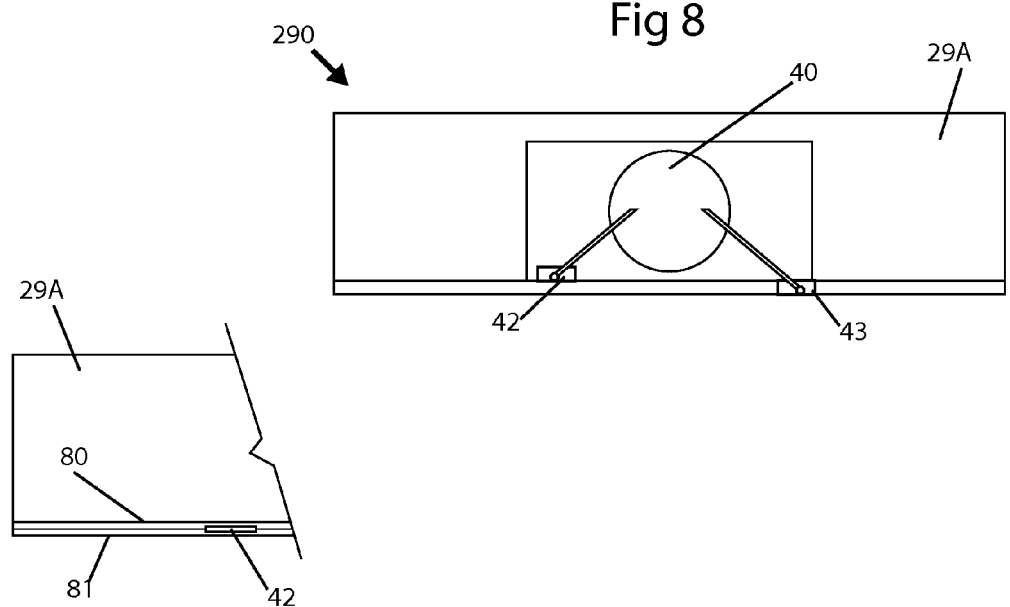

STORAGE TANK LEVEL DETECTION METHOD AND SYSTEM

FIELD OF INVENTION

The present invention relates to placing a string of heat sensors vertically down an outside wall of a fluid storage tank. Identifying each temperature sensor and calculating the different temperatures of adjacent sensors provides a fluid level indication between a flowable material (oil) and a void (air).

BACKGROUND OF THE INVENTION

U.S. Pat. No. 6,959,599 (2005) to Feldstein et al. discloses a storage tank level detector based on heating and then measuring the resistance drop of a vertical string of resistive elements.

The theory is that the rate of heat transfer is different between a mass of flowable material and the void volume above it such that for any container with a modest heat conducting capability, the container will experience a temperature gradient which is most pronounced at the interface of the contents with the void volume above the contents, and of course below that interface. That is to say, the rate of heat transfer through the wall of a container will be greater where there is a mass of flowable material located in the container than where there is a void volume above the flowable material. In other words, the rate of heat transfer through the container wall changes most abruptly at the level of the interface, and below. Thus, with the use of a thermochromatic material, a vivid color change occurring at the interface and below, will permit an observer to obtain a direct reading of the level of the flowable material within a container by discerning where the interface is located.

RAIT U.S. patent application Ser. No. 10/077,971 filed Feb. 20, 2002, for "External Liquid Level Gauge," teaches an external liquid gauge which is adapted to be affixed vertically to the outside wall of a container. The external liquid level gauge as taught therein is in the form of an elongated strip and it comprises a layer of base material and a layer of thermochromatic materials. Furthermore, the thermochromatic layer comprises a light absorbing background and at least two regions of thermochromatic materials which are arranged upon the light absorbing background. The regions of at least two thermochromatic materials are disposed in arrays thereof and are arranged entirely along the length of the external liquid level gauge. Moreover, each of the thermochromatic materials responds chromatically within a different operating temperature range.

Accordingly, both for Feldstein and the present invention, it is desirable to provide a level detector for storage tanks for fluids that can be remotely operated, or at least that can function and provide data indicative of the level of fluid storage in a storage tank without on-site human intervention. Accordingly, any level indicator which relies on a visual indication is not at all useful. Moreover, it is the intent and purpose of the present invention to provide level detectors for storage tanks and the like which are external, and therefore do not rely on float and valve assemblies and the like, and which can therefore also be applied to a wide variety of storage tank structures.

The present invention is intended to function so as to provide an approximation of the fluid level within a storage tank. As will be seen, particularly when remote storage tanks are considered, it is unimportant to be exact, provided that an approximation to within at least a few percent of the actual fluid level within the storage tank can be arrived at. Feldstein discovered that it is quite possible to take advantage of the theory of the rate of heat transfer being different between a fluid such as a liquid, and the void volume above it, for any container which has at least a modest heat conducting capability, where such theory may be exploited remotely as a consequence of the use of elements or material which have high temperature coefficients. Feldstein determined that by appropriate spacing of heating elements vertically along the wall of a storage tank, and by applying appropriate sampling techniques to determine the difference between the rate of heat loss by conduction from various previously heated elements arranged vertically along a storage tank wall, a quite reasonable approximation of the fluid level within the storage tank can be determined.

All of this is possible because elements and materials exist that do, indeed, have appropriate high temperature coefficients; and because remote control of sampling and data communication is easily achievable.

For example, a remote location might, indeed, be connected at least by wire or wireless means into a network, a specific URL, wireless radio identity, mobile or cellular telephone number, or other electronic identity, so that it may be polled from time to time. Such polling would instruct that a level detection procedure should proceed alternatively, or as well, any remote location can be set up and programmed so that it will, on its own, periodically "wake up" and perform a level detection procedure as described hereafter.

By the provision of battery operated electronic and electrical apparatus, the present inventors have been able to provide a level detector for storage tanks for fluids that is remotely located, and which may function periodically or on demand, requiring visits to the remote location only when it is necessary to refill or empty the storage tank. Typically, the battery life of batteries that are on site at the remote location is designed and expected to be much greater than the anticipated interval between refilling visits, but nonetheless the batteries can be exchanged for new ones each or every few refilling visits since the cost of replenishing a battery is minuscule when compared to the cost of refilling the storage tank.

One problem with Feldstein's invention is that it does use considerable electricity to charge the resistors. Also both a charging and a measuring system is needed.

The present invention only uses passive tiny temperature sensors and a microprocessor at the tank to accomplish an accurate level detecting system. The delta temperatures between vertically spaced temperature sensors provide raw data that a microprocessor can use to calculate the interface between a void and oil as well as an interface between oil and the water at the bottom of the tank. These level interfaces can be viewed locally on a display and/or relayed remotely.

A new and non-obvious electronic level detector system is simpler and less expensive than any known system.

SUMMARY OF THE INVENTION

The present invention provides a level detector for storage tanks for fluids which comprises a power source, a microprocessor, a plurality of temperature sensors connected in a network across the power source, and wherein each sensor has a unique ID so as to allow computations of temperature spikes at fluid interfaces.

In use, the plurality of temperature sensors are attached to the side wall of the storage tank over the height thereof where the level of the fluid within the storage tank is expected to vary over time, so at least the approximate level of fluid in the storage tank may be detected from time to time.

The power source is adapted to provide a low voltage across the network of temperature sensors.

The spacing between adjacent pairs of temperature sensors is greater than the thickness of the wall of the storage tank to which the temperature sensing elements are attached and is nominally set at four inches.

The microprocessor is adapted to identify each temperature sensor and make calculation to pinpoint a fluid interface.

Therefore, an approximation of the fluid level within the storage tank can be made, because it will be at or in the immediate region of the specific pair of temperature elements where the delta between the sensors is greatest.

The main aspect of the present invention is to provide a string of temperature sensors vertically down the outside of a storage tank, wherein each sensor sends its measurement and identity code to a microprocessor.

Another aspect of the present invention is to execute various calculations on the delta temperature between the sensors to estimate an interface of fluids inside the tank.

Another aspect of the present invention is to package the sensors in a weatherproof strip easily attachable to the outside of the tank.

Another aspect of the present invention is to provide a level display at the tank.

Another aspect of the present invention is to provide a remote level signal.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 3 is a wiring diagram of a three wire embodiment.

FIG. 4 is a wiring diagram of a two wire embodiment.

FIG. 5 is an output display of a single interface (air to oil) tank,

FIG. 6 is an output display of a dual interface (air to oil and oil to water) tank.

FIG. 7 is a sectional view of a three wire strip.

FIG. 8 is a sectional view of a two wire strip.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
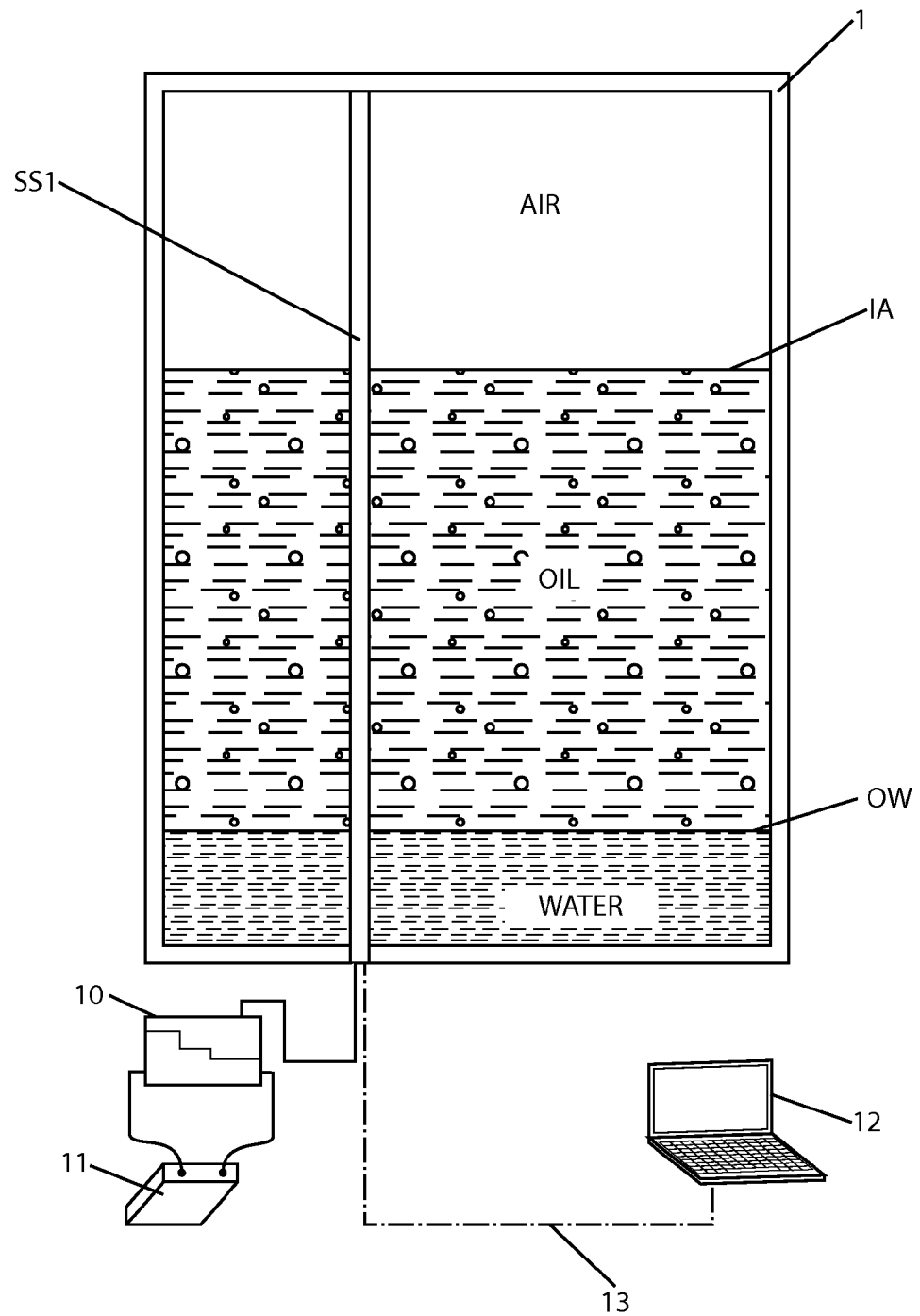
FIG. 1 is a schematic representation of a storage tank with the sensor strip, local microprocessor and display and remote readout device.

Referring first to FIG. 1 an oil storage tank 1 has a void (air) on top, OIL in the middle, and WATER on the bottom. Thus, interfaces IA and OW are formed. A sensor strip SS1 is attached to the outside of the tank 1, and it is connected to a microprocessor system with level display 10. A battery 11 supplies DC voltage to system 10. The level data is sent remotely to computer 12 in any prior art manner as indicated by dashed lines 13.

Figure 2:
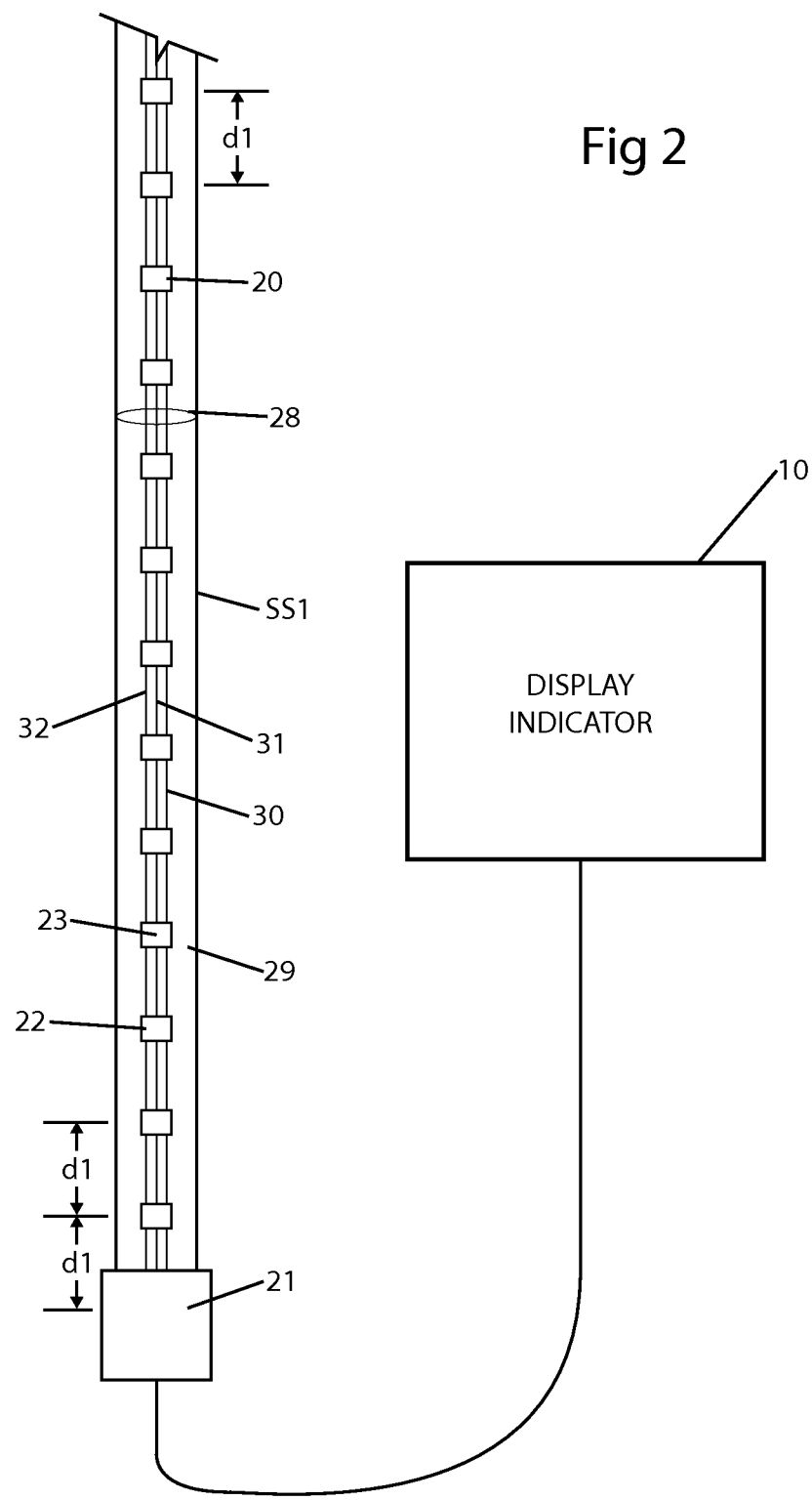
FIG. 2 is a front elevation view of the sensor strip.

Referring next to FIG. 2 the sensor strip SS1 consists of a series of temperature sensors 20, each one having a unique electronic signature. The nominal distance d1 is four inches. A serial sensor interface 21 is preferably set at the bottom outside of the tank 1. Thus, the height above ground of sensor 22 is one foot, and the height above ground of sensor 23 is one foot four inches. The plastic strip 29 can be any thin polymer material including a closed call PVC. One source of the temperature sensors is Dallas Semiconductor™ Model No. DS18S20. The three wire copper connecting wires are sealed between two strips 29 as seen in FIGS. 7, 8.

Referring next to FIG. 3 the conductive wires are labeled 30, 31, 32. Sensor 22 has an electronic signature "123". Sensor 23 has an electronic signature "456", and so forth to sensor N. The sensors are powered by wire 30 (ground) and wire 32 (+5V). Each sensor sends its electronic signature and its temperature along wire 31 to the sensor interface 21. Thus, a temperature profile every four inches is obtained at level display 10 of FIG. 1.

Referring next to FIG. 4 a two wire embodiment SS2 is shown with wires 42 (ground) and 43 (+5V and temperature signals). Sensor 40 has electronic signature "120", and sensor 41 has electronic signature "340". A two wire sensor interface 212 is shown. The end results are the same for either SS1 of SS2.

Referring next to FIG. 5 the display 50 from a single interface (air/oil) tank is shown. The sensors are labeled 1 to 49. Thus, the height is the multiple of the sensor number times four inches. The interface is indicated around sensor 23. This is where in most conditions the air temperature of about 15° C. is colder than the oil temperature of about 30° C. The air generally tracks the daytime temperature while the oil retains its heat from the overall ambient temperature average. Of course an extremely hot day out of the average could reverse the temperature, but the interface would still yield the level. The worst accuracy would occur at exactly a match of temperatures between the oil and air. In that scenario the system memory can produce a (nominally twelve hour) history which will yield the present level unless pumping has occurred.

Referring next to FIG. 6 a display 60 shows a dual interface result. The water to oil interface OW occurs at about the fifteenth sensor, and the oil to air interface IA occurs at about the 32nd sensor.

Referring next to FIG. 7 a first embodiment strip 29 consists of a closed cell PVC layer 29A glued to a plastic strip 29B with wires 30, 31, 32 running between layers 29A and 29B. The sensor 20 is wired as shown in FIG. 3. The sensor 22 gets pushed into the thicker closed cell PVC layer 29A.

Referring next to FIG. 8 a lighter strip 290 is shown as a two wire as in FIG. 4, but could be a three wire strip. A two layer sandwich 80, 81 of polyamide plastic encapsulates the flat wires 42, 43. Then a waterproof (rubber) strip 29A covers the sensors and connections to the sensor.

Figure 9:
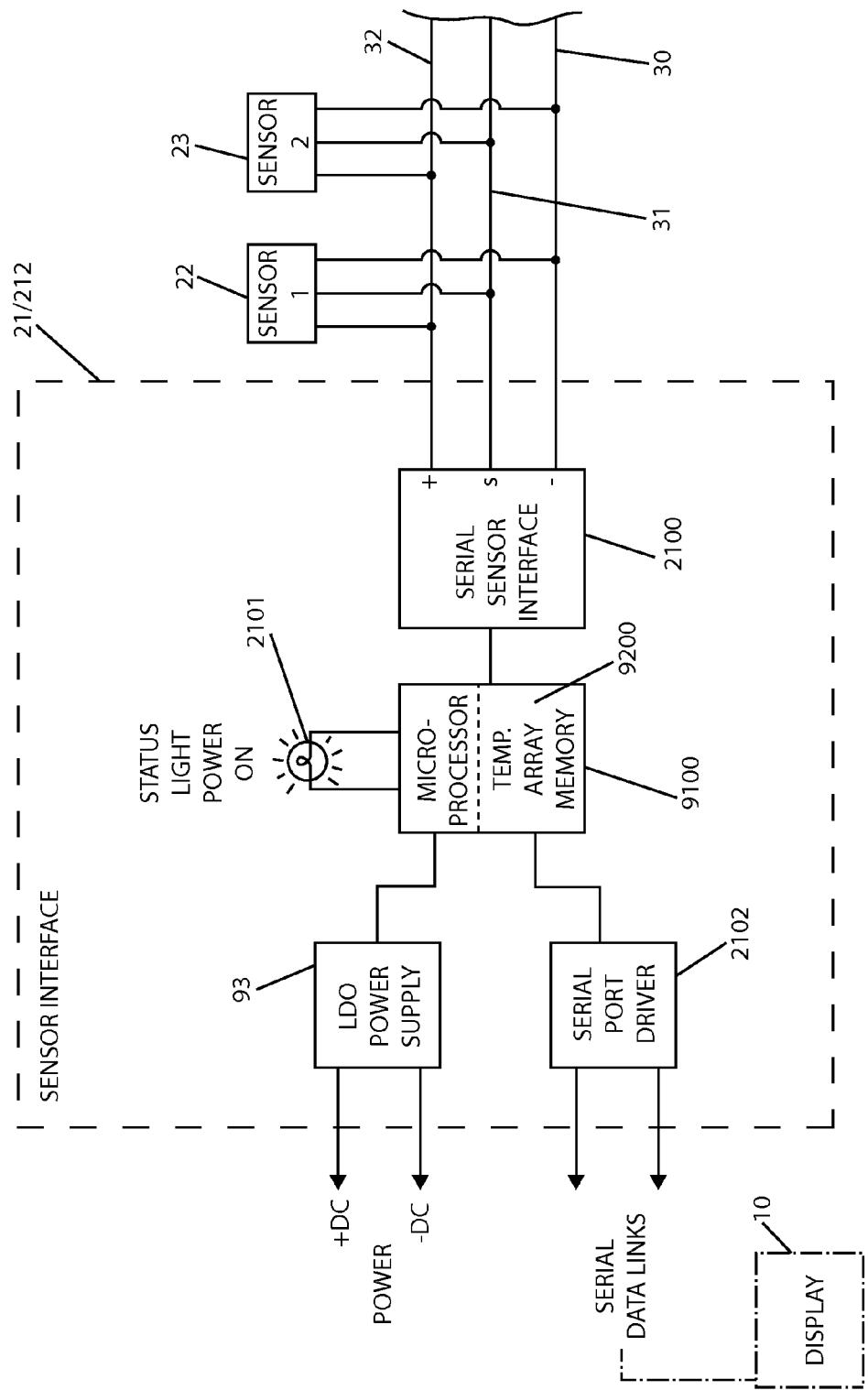
FIG. 9 is a schematic of the sensor strip interface.

Referring next to FIG. 9 the apparatus from FIG. 3 item 21 and FIG. 4 item 212 is shown. Dashed lines 90 may represent a physical housing. The sensor interface 2100 feeds into a processor 9100 that also has a temperature array memory 9200. This memory 9200 merely stores ID and temperature histories on a cyclical basis such as per minute. Power could be a car battery, and power supply 93 provides a level 5 V DC. The microprocessor 9100 via serial port driver 2102 sends a serial signal to the system 1499 (FIG. 14) and remotely if desired.

The m-controller box 21/212 polls via its microprocessor 9100 each temperature sensor (nominally each second). Each electronic signature on the strip has been entered into the m-controller box 21/212 beforehand. Thus, a history log of sensor ID and its temperature is stored in the m-controller box 21/212. The light 2101 indicates power is coming into the m-controller box 21/212.

Serial sensor interface 2100 is a circuit protector (static protector) for the microprocessor 9100. Serial port driver 2102 sends the temperature array memory 9200 to designated recipients including the FIG. 14 system 1499. Remote data sending can also be incorporated into serial port driver 2102 such as cell phone interface. An alternative design could place the functions of microprocessor 9100/9200 upstream to a cloud computing system.

Figure 15:
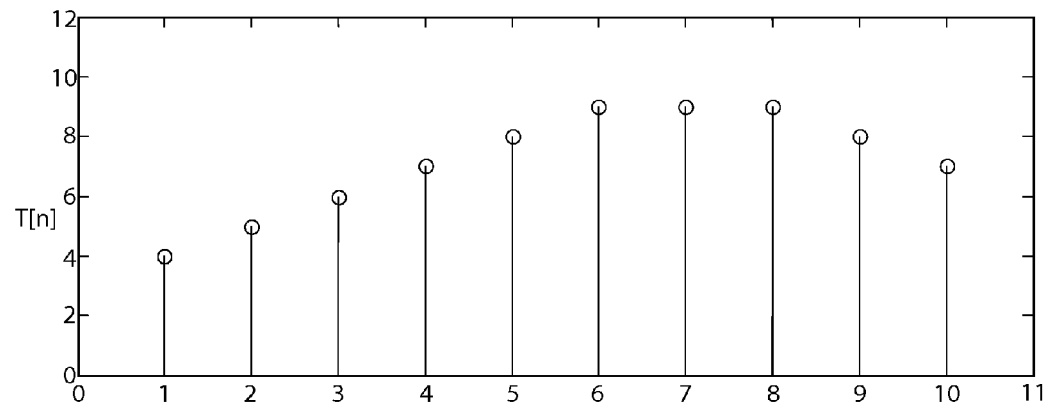
FIG. 15 is a graph of original temperature data.

The present invention having individual sensors spaced at regular intervals along a sub-straight lends itself to analysis using standard discrete signal processing techniques. For a sensor strip with, N total sensors along its length, we can write:

$$T[n] = \text{Temperature reading of sensor}[n]$$

for all n's from 1 to N
Where T[n] is the temperature reading at sensor n.
The above results in an array of length N with each array element being the temperature for a given sensor located physically at location n.
To form the first derivative of the temperature array T[n], which is the same as the rate of change for the temperature array data, we form, $$T^*[n] = T[n] - T[n-1]$$

for all n's from 2 to N
The resulting T*[n] array will be N−1 in length which may be fine for many applications, however for the current invention, a padding technique is employed to eliminate the reduction in the output data set size. If the original data set has N=10, the data may be represented as shown in FIG. 15. To pad the FIG. 15 data to eliminate the data set reduction, one of two simple methods may be used. The first is to pad both ends of the data with the first or last data points respectively, Or, $$T[0] = T[1] \text{ along with } T[11] = T[10]$$

For the present invention, slope padding is used meaning that $$T[0] = T[1] + (T[1] - T[2])$$

And $$T[11] = T[10] + (T[10] - T[9])$$

Figure 16:
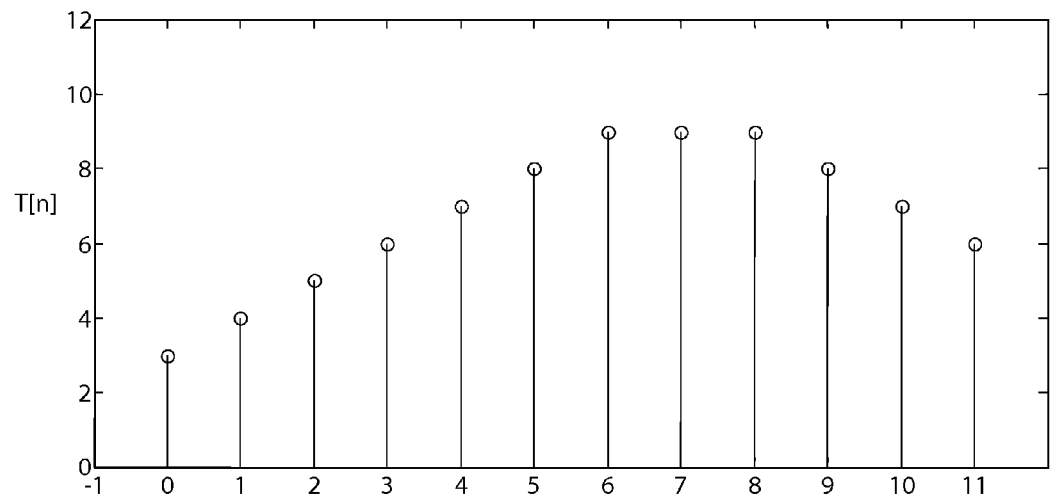
FIG. 16 is a graph of "padded" temperature data.
Figure 17:
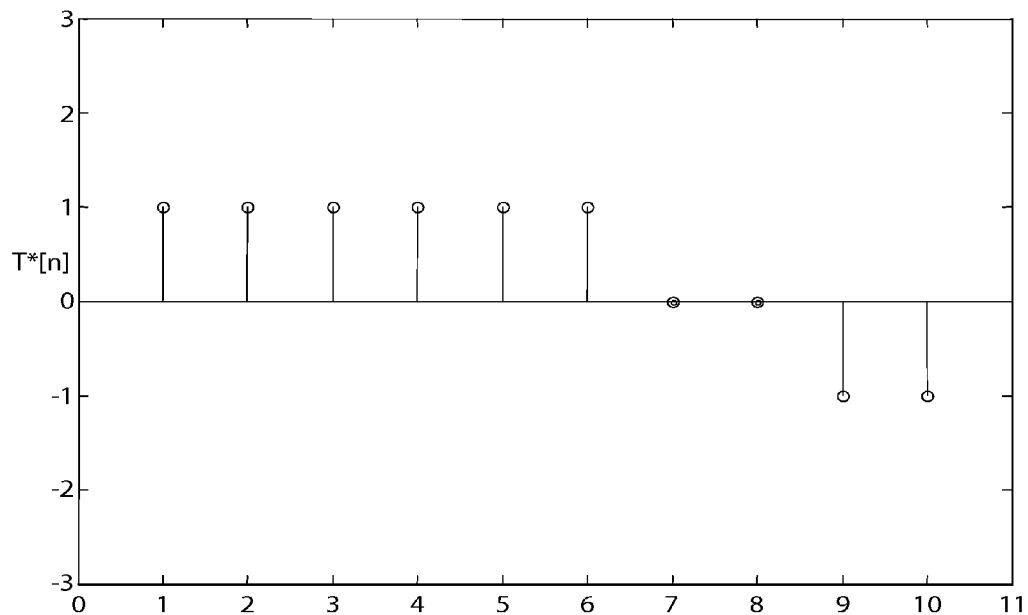
FIG. 17 is a graph of derivative data.

This padding technique results in the original data being transformed into the original data plus padded data on each end as shown in FIG. 16.
Where T[0] and T[11] have been added based on the general slope of the nearby T[n] data points. This type of padding improves the overall accuracy of the system about the end points.
Once the data has been padded, the derivative of the data can be obtained without the reduction in data points mentioned previously. For the FIG. 16 data set, T[n] with padding, a graph of T*[n] is given in FIG. 17
Once the $1^{st}$ derivative of the data has been formed, T*[n], this data can be used to form the second derivative given by, $$T^{**}[n] = T^*[n] - T^*[n-1]$$

Figure 18:
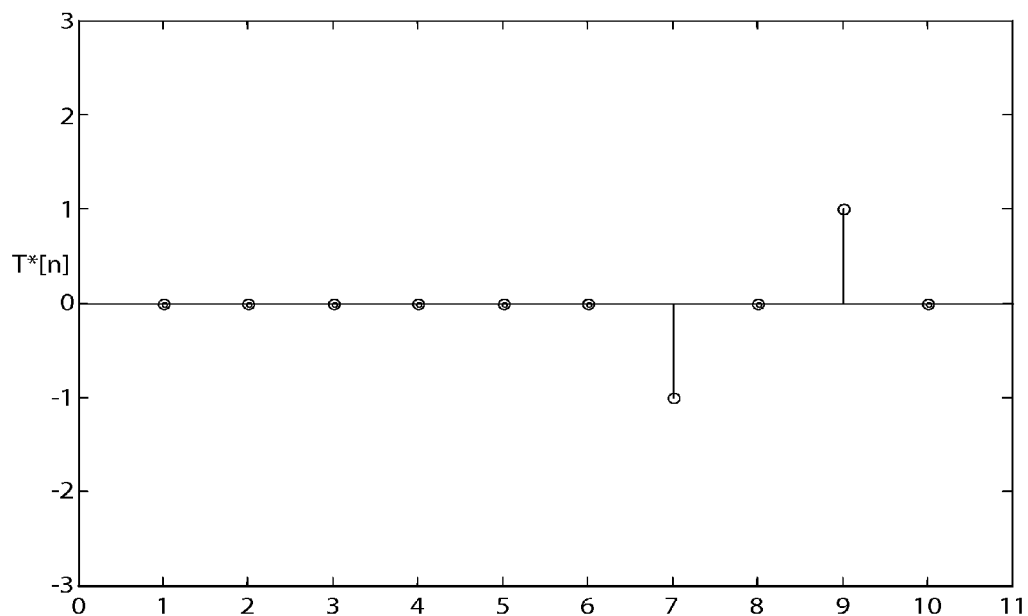
FIG. 18 is a graph of second derivative data.

T*[n] data may also be padded to retain overall number of samples in the resulting second derivative array, T**[n]. The $2^{nd}$ derivative data graph for the data set in this example is given in FIG. 18.

Figure 10:
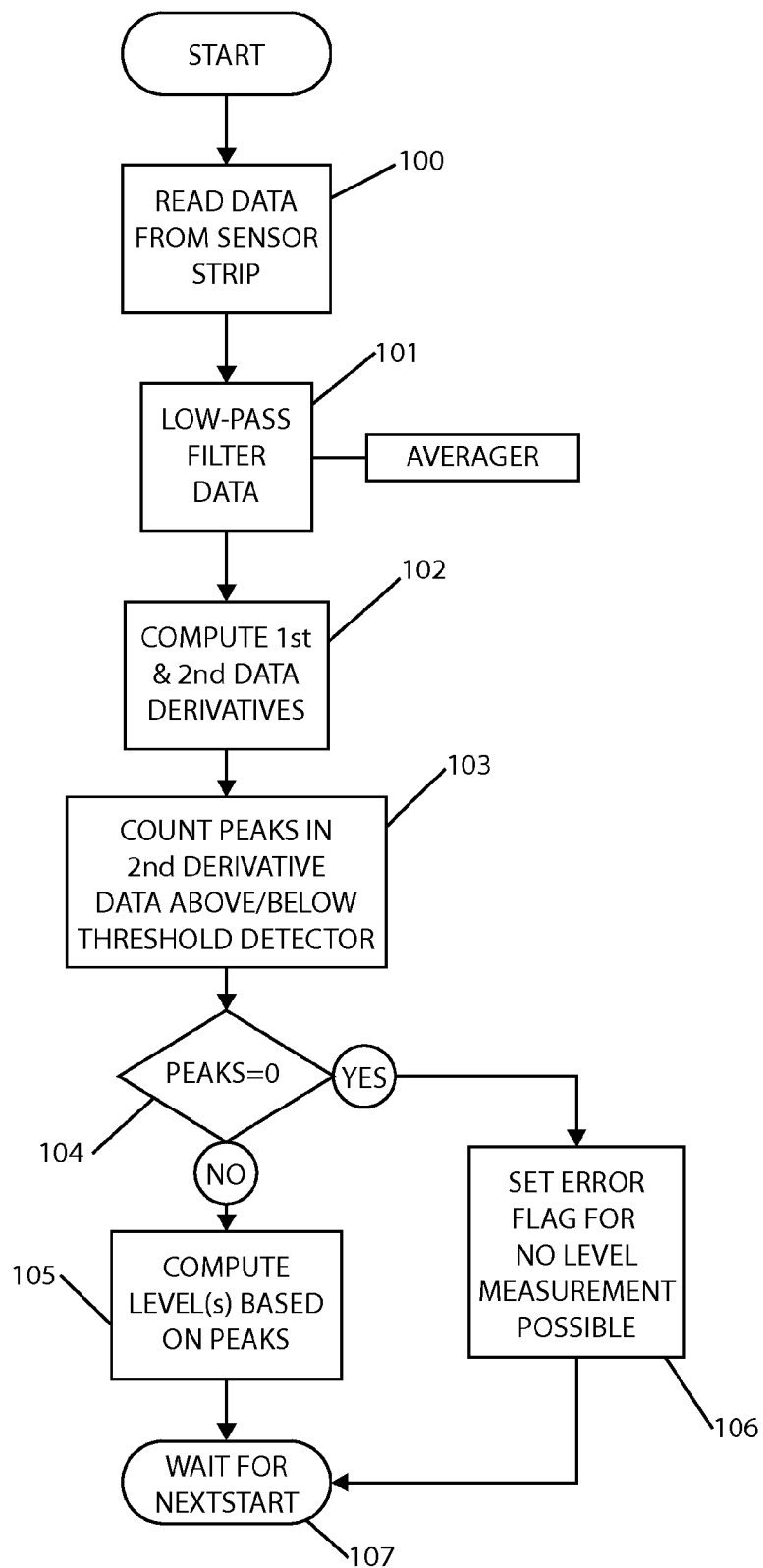
FIG. 10 is a logic flow chart of the two derivative algorithm.

Referring next to FIG. 10 the logic flowchart for a two derivative system logic is shown. Block 100 gathers raw sensor and temperature data. Block 101 is an average to ensure the same sensor is not sending a wild, meaningless temperature.

A derivative is illustrated here:

|  |  |  |  | First Derivative | Second Derivative |
|---|---|---|---|---|---|
| Sensor 2 | Minus | Sensor 1 | Equals | 0° Difference | 0° |
| Sensor 3 | Minus | Sensor 2 | Equals | 0° Difference | 0° |
| Sensor 4 | Minus | Sensor 3 | Equals | 0° Difference | 0° |
| Sensor 5 | Minus | Sensor 4 | Equals | 10° Difference (20° C.-10° C.) | 10° (difference between the difference of the sensors) |
| Sensor 6 | Minus | Sensor 5 | Equals | 10° Difference (20° C.-10° C.) | 0° |
| Sensor 7 | Minus | Sensor 6 | Equals | 0° | −10° |
| Sensor 8 | Minus | Sensor 7 | Equals | 0° | 0° |
| Sensor 9 | Minus | Sensor 8 | Equals | 0° | 0° |
| Sensor 10 | Minus | Sensor 9 | Equals | 0° | 0° |

Figure 19:
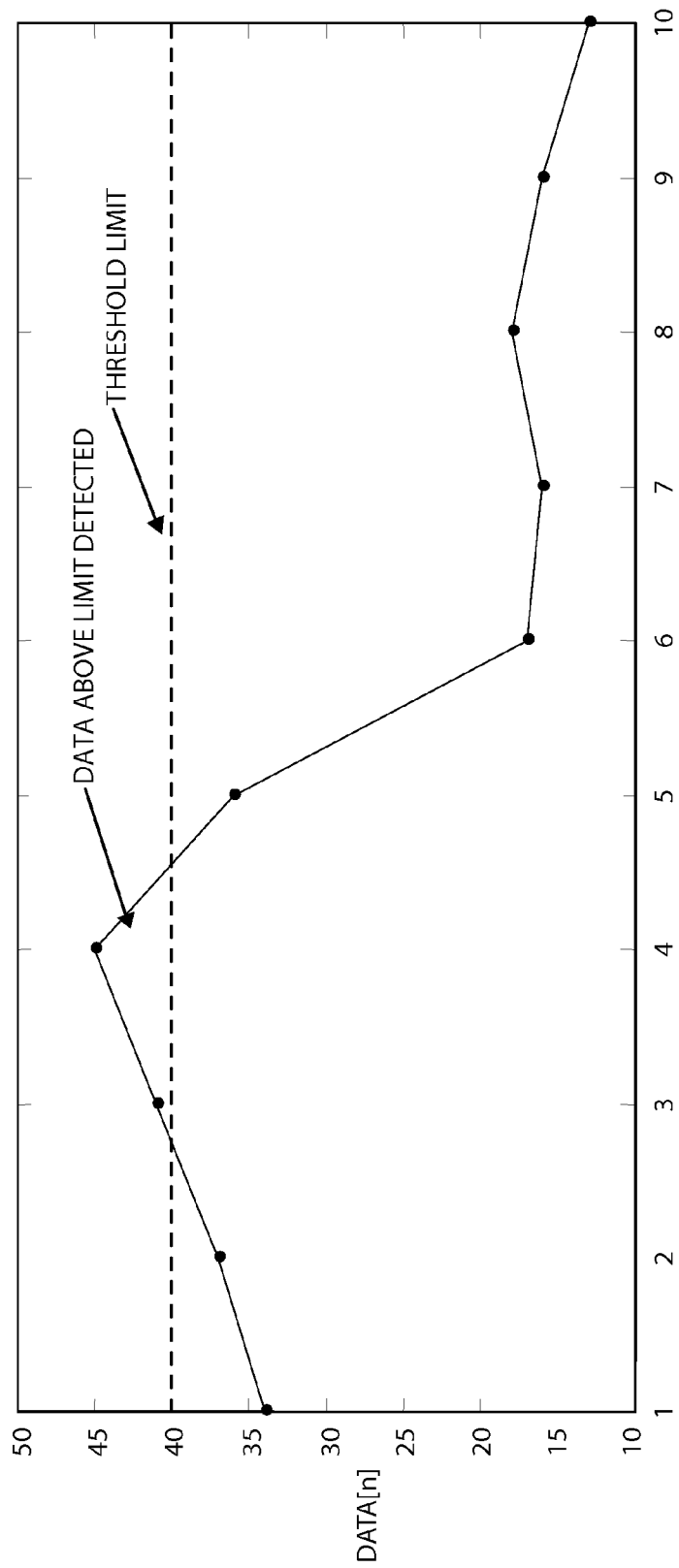
FIG. 19 is a graph of depicting a "threshold limit."

Block 102 shows a first and second derivative computation as noted above. Block 103 counts the peaks in the second derivative above/below a threshold detector. A threshold detector is defined as an estimated temperature line TL (FIG. 13) and FIG. 19 that is applied to find if two delta points go in opposite directions. Thus, an interface exists at that point 1302 above or below the threshold detector TL.

Figure 13:
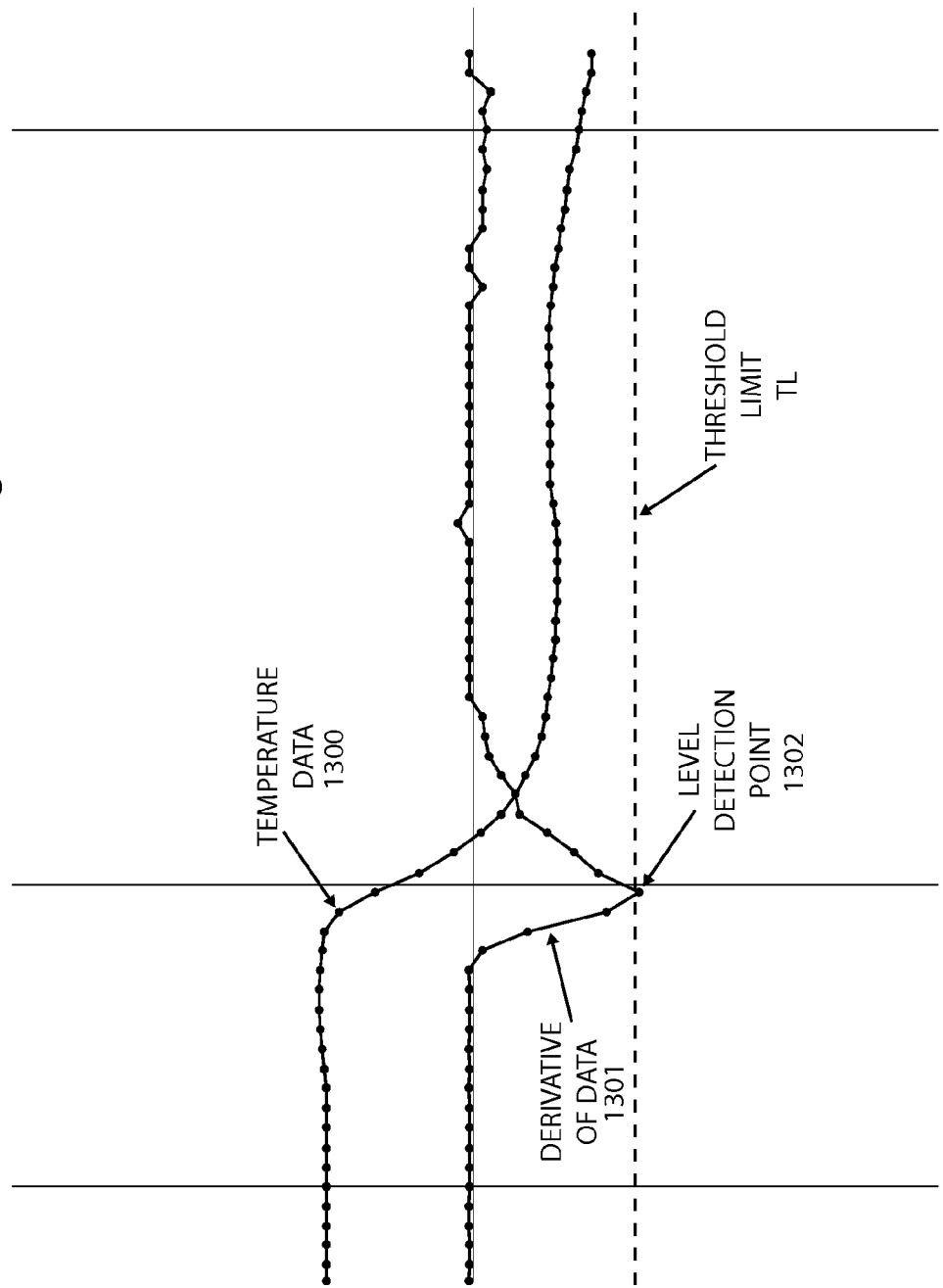
FIG. 13 is graph of a temperature and a single derivative data plot.

Decision block 104 shows a positive number of peaks at the NO branch which then leads to Block 105, a computation of the level based on the peaks (see FIG. 13). If there are no peaks it can mean either a full tank, and empty tank, or a broken system, see the yes branch of 104. This condition leads to Block 106, set a "no level measurement possible" flag. The pre-programmed option can include a view history and/or Block 107, wait for next start. The microprocessor is programmed to a desired sensor periodic scan rate for each start.

Figure 11:
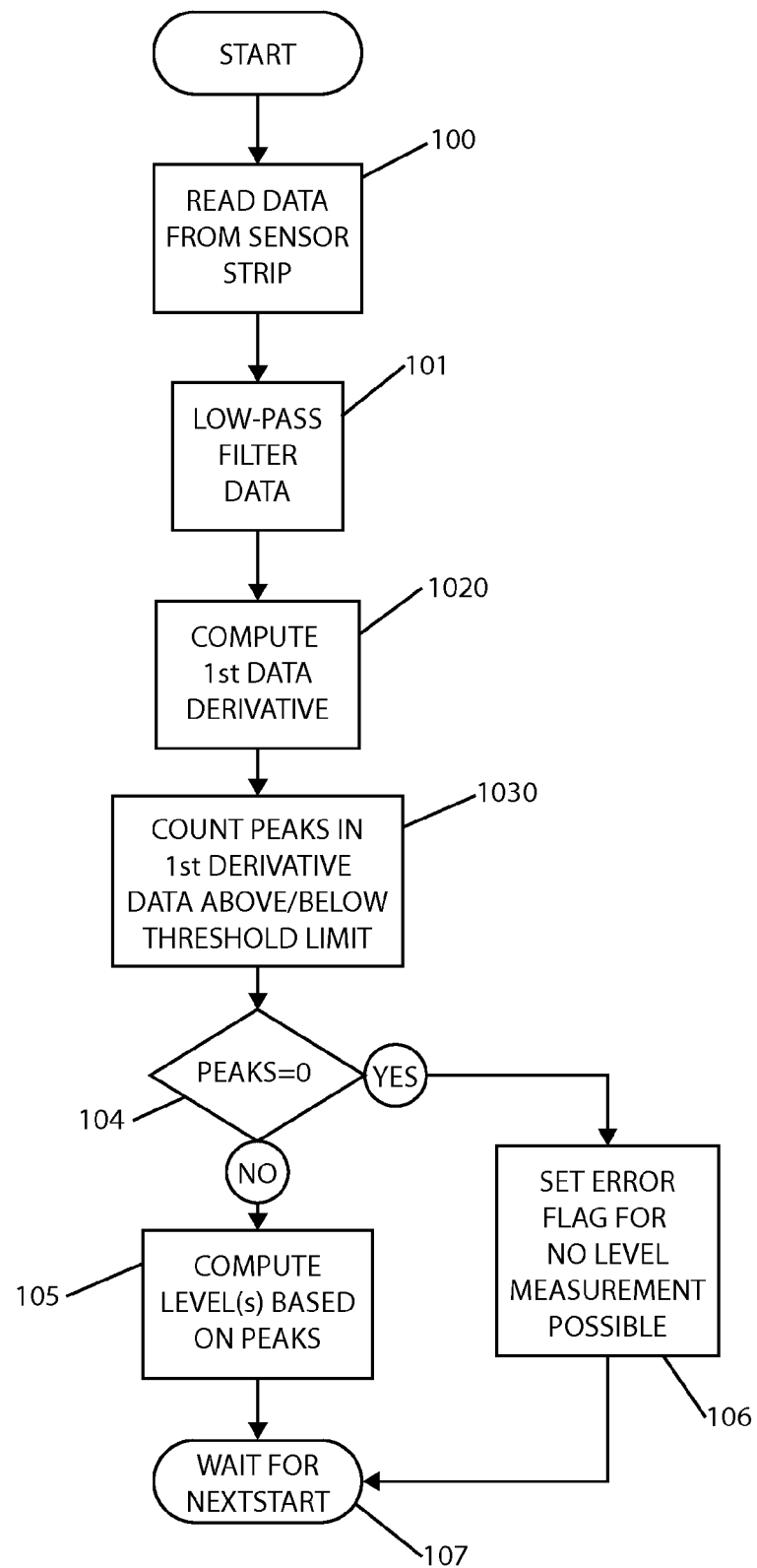
FIG. 11 is a logic flow chart of the one derivative algorithm.

Referring next to FIG. 11 the only different logic step is Block 1020 only uses one derivative calculation as compared to FIG. 10 using two. Block 1030 only counts the peaks form the first derivative calculation.

Referring next to FIG. 13 the improvement in accuracy of level detection is shown using either the one or two derivative calculations. Line 1300 shows only the raw sensor temperatures. Line 1301 shows the tracking of the derivatives. And the level detection point 1302 is defined clearly as opposed to any estimate made from line 1300.

Figure 12:
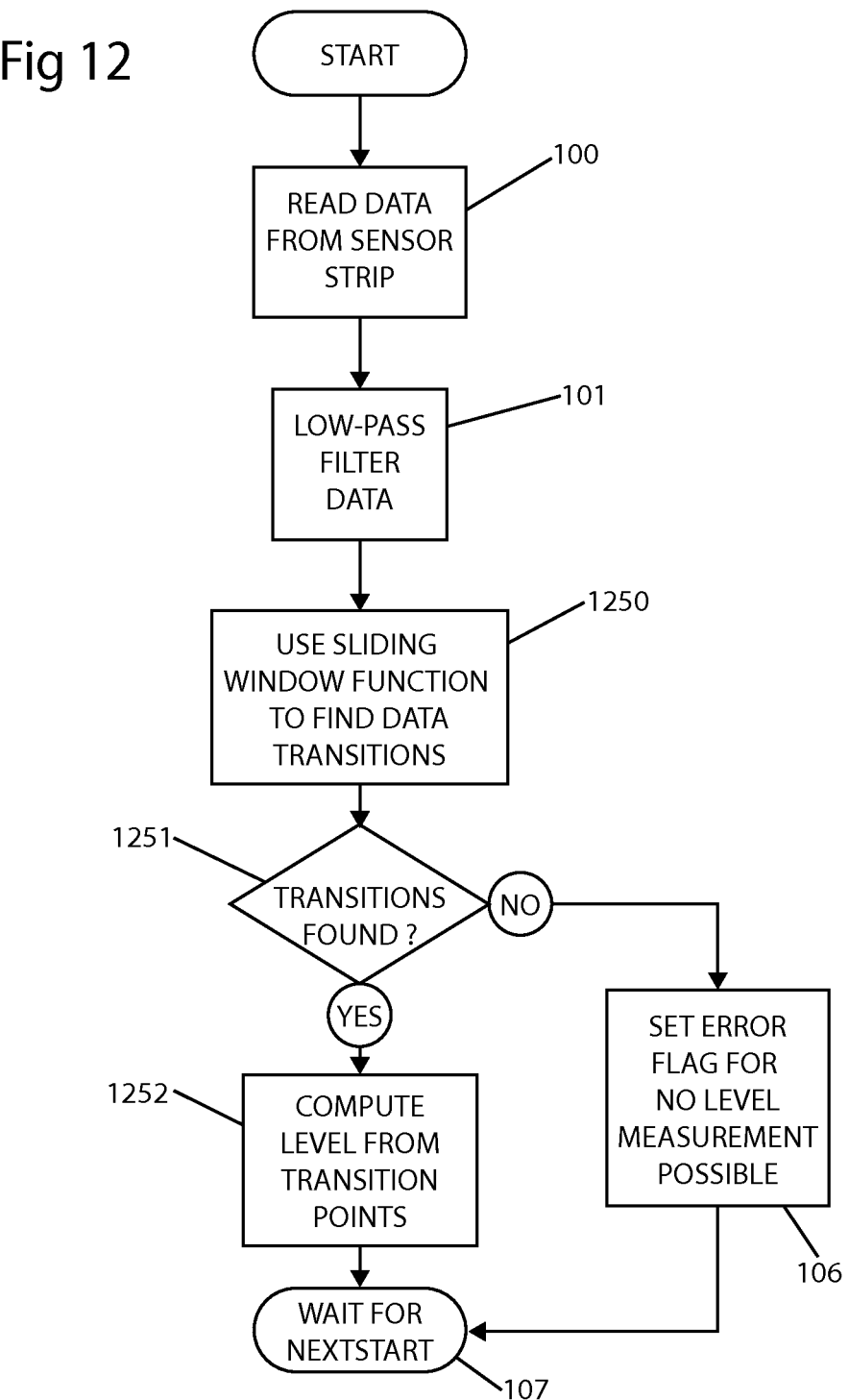
FIG. 12 is a logic flow chart of the sliding window algorithm.

Referring next to FIG. 12 an alternate computation logic is shown. For example we can use a three sensor window as follows:

Sensor 1
+Sensor 2
+Sensor 3
- - -
TOTAL Temp=60° C.
Average Temp=20° C.
Sensor 4
+Sensor 5
+Sensor 6
- - -
TOTAL Temp=90° C.
Average Temp=30° C.

Thus, an interface is estimated to exist near the split between the windows of sensors 1, 2, 3 and 4, 5, 6 with a four inch sensor spacing, this yields a pretty accurate level. Block 1251 shows this transition found (one), and Block 1252 defines which window of sensors had the transition.

Figure 14:
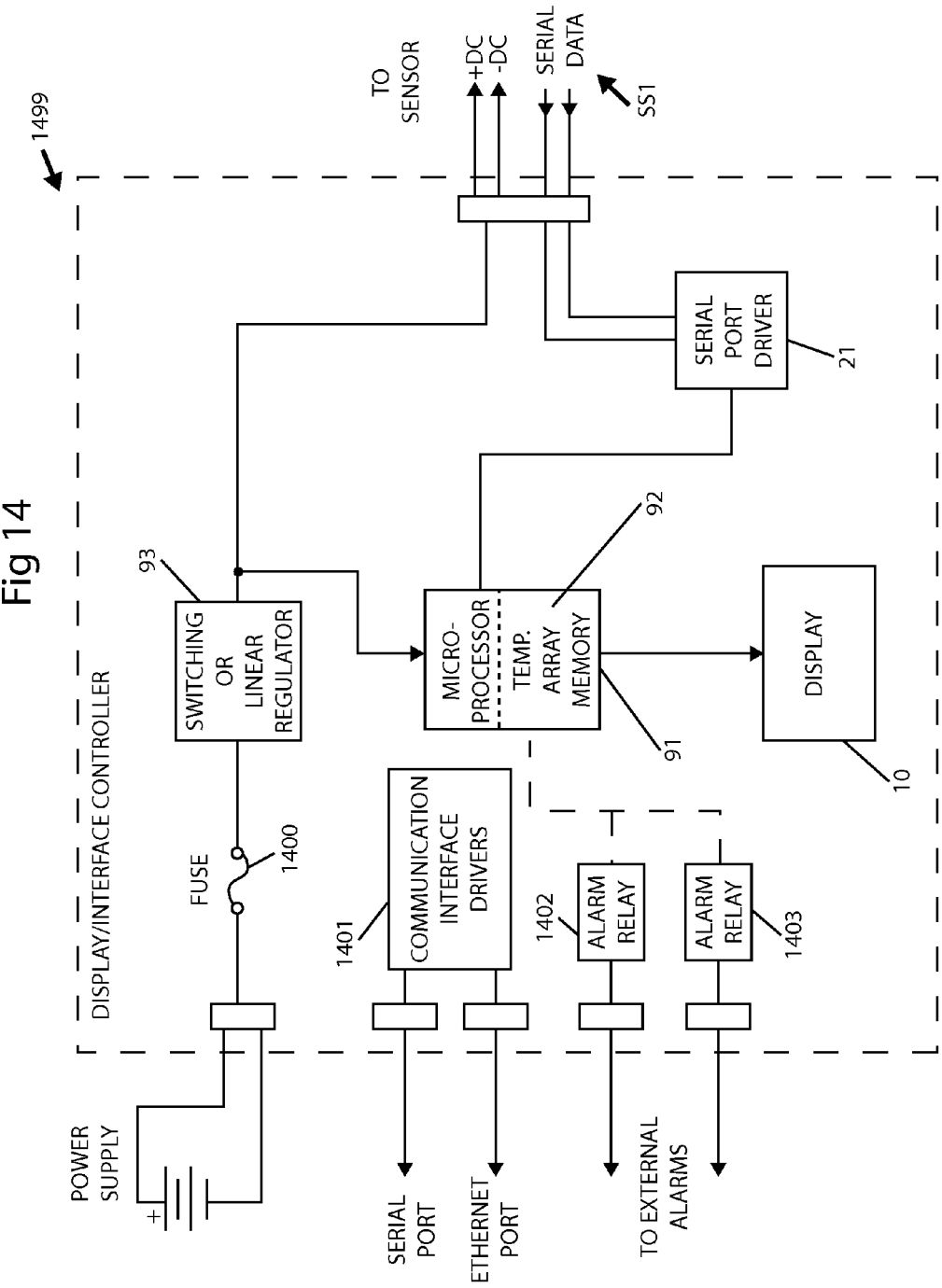
FIG. 14 is a schematic of the entire system.

Referring next to FIG. 14 a full blown system 1499 is shown. A fuse 1400 is added. A remote communication subsystem 1401 connects to the microprocessor 91. Various alarms (too full, too empty) 1402, 1403 can set off local and/or remote alarms. The display 10 can be shown vertically in feet, meters, or other measurement units.

The microprocessor 92 and its functions described herein, as one skilled in the art would know, can be achieved using alternative circuits. These alternative circuits include personal computers, programmable logic controllers (PLC's), and programmable gate arrays (PGA's). For our terminology all of these systems are called a "processor."

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A storage tank level detection system comprising:
a vertical, insulated strip attached to an outside of a storage tank;
at least three temperature sensors placed at a known distance from each other on the insulated strip;
not more than three connecting wires, at least four feet in length, connecting, in parallel on a serial sensor interface, the at least three temperature sensors to a power supply and a processor;
wherein the vertical, insulated strip further comprises a base plastic strip having not more than three connecting wires and the temperature sensors on a top thereof;
wherein each temperature sensor sends its temperature to the processor; and
said processor stores each sensor identification and its temperature.

2. The system of claim 1, wherein the vertical, insulated strip further comprises a protective strip affixed over the base plastic strip.

3. The system of claim 1, wherein the vertical, insulated strip further comprises a double layer base layer having flat connecting wires sandwiched therein, with the temperature sensors protruding above a top member of the double layer, and a protective strip affixed over the double layer base.

4. The system of claim 1, wherein the processor receives the stored sensor ID's and temperature, and calculates a tank level.

5. The system of claim 4, wherein the processor further comprises a program to calculate a delta temperature between each adjacent pair of temperature sensors and a display to show this result which is called a first derivative.

6. The system of claim 5, wherein the processor further comprises a program called a second derivative to calculate a delta of delta temperatures taken from the first derivative and a display to show this result.

7. The system of claim 4, wherein the processor further comprises a program to calculate a group average temperature among three or more sensors and compare this average to an average of an adjacent group, thereby estimating a fluid interface when an group to group average is a different temperature.

8. The system of claim 4, wherein a weatherproof housing at the tank houses the processor and a visual display, and the power supply is a twelve volt source.

9. The system of claim 1, wherein the processor further comprises a memory to store a history of temperature sensor readings.

10. The storage tank level detection system of claim 1, wherein the known distance between each sensor is nominally four inches.

11. The storage tank level detection system of claim 1, wherein the not more than three connecting wires are each at least sixteen feet in length.

12. The storage tank level detection system of claim 11, wherein the not more than three connecting wires also connect to a ground.

\* \* \* \* \*